US011306188B2

(12) United States Patent
Matsumoto et al.

(10) Patent No.: US 11,306,188 B2
(45) Date of Patent: Apr. 19, 2022

(54) OPTICAL FILM AND METHOD FOR MANUFACTURING OPTICAL FILM

(71) Applicant: FUJIFILM Corporation, Tokyo (JP)

(72) Inventors: Ayako Matsumoto, Kanagawa (JP); Shuntaro Ibuki, Kanagawa (JP); Chihiro Masuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 109 days.

(21) Appl. No.: 16/437,378

(22) Filed: Jun. 11, 2019

(65) Prior Publication Data

US 2019/0310396 A1    Oct. 10, 2019

Related U.S. Application Data

(63) Continuation of application No. PCT/JP2017/037352, filed on Oct. 16, 2017.

(30) Foreign Application Priority Data

Dec. 22, 2016 (JP) .............................. JP2016-250146
Feb. 9, 2017 (JP) .............................. JP2017-022603
May 22, 2017 (JP) .............................. JP2017-101153

(51) Int. Cl.
| | |
|---|---|
| *G02B 1/14* | (2015.01) |
| *C08J 7/046* | (2020.01) |
| *B05D 3/12* | (2006.01) |
| *B29C 43/24* | (2006.01) |
| *B32B 7/02* | (2019.01) |
| *C09D 5/33* | (2006.01) |
| *C09D 7/61* | (2018.01) |
| *C09D 135/02* | (2006.01) |

(52) U.S. Cl.
CPC .............. *C08J 7/046* (2020.01); *B05D 3/12* (2013.01); *B29C 43/24* (2013.01); *B32B 7/02* (2013.01); *C09D 5/004* (2013.01); *C09D 7/61* (2018.01); *C09D 135/02* (2013.01); *G02B 1/14* (2015.01); *Y10T 428/24355* (2015.01)

(58) Field of Classification Search
CPC .. G02B 1/11; G02B 1/111; G02B 1/14; G02B 1/10–18
See application file for complete search history.

(56) References Cited

U.S. PATENT DOCUMENTS

| | | | |
|---|---|---|---|
| 10,549,514 B2 | 2/2020 | Obuchi et al. | |
| 2007/0139783 A1* | 6/2007 | Furuya | G02B 1/111 359/606 |
| 2008/0192353 A1* | 8/2008 | Nagahama | G02B 5/0221 359/599 |
| 2009/0268290 A1* | 10/2009 | Fujita | C08L 1/14 359/485.01 |
| 2010/0284071 A1* | 11/2010 | Kodama | G02B 5/3033 359/485.01 |
| 2012/0033302 A1* | 2/2012 | Suzuki | G02B 19/0028 359/597 |
| 2015/0177433 A1 | 6/2015 | Kumagai et al. | |
| 2015/0285595 A1* | 10/2015 | Auchter-Krummel | B32B 17/10018 428/46 |
| 2015/0316442 A1* | 11/2015 | Tamada | G01M 11/00 356/73 |
| 2016/0115340 A1 | 4/2016 | Hashimoto et al. | |
| 2016/0266361 A1* | 9/2016 | Schuhmacher | C23C 16/401 |
| 2016/0326383 A1* | 11/2016 | Pokorny | C09D 7/62 |
| 2017/0218206 A1* | 8/2017 | Yamane | C09D 7/61 |
| 2017/0307790 A1* | 10/2017 | Bellman | C09D 5/006 |
| 2018/0065348 A1* | 3/2018 | Obuchi | B32B 25/08 |
| 2019/0092947 A1* | 3/2019 | Yamane | C09D 5/004 |
| 2019/0352531 A1* | 11/2019 | Itagaki | B32B 27/20 |

FOREIGN PATENT DOCUMENTS

| | | |
|---|---|---|
| CN | 104428699 A | 3/2015 |
| JP | 2010-000739 A | 1/2010 |
| JP | 2010-069702 A | 4/2010 |
| JP | 2012-038626 A | 2/2012 |
| JP | 2012-072235 A | 4/2012 |
| JP | 5267925 B2 | 8/2013 |
| JP | 2014-228833 A | 12/2014 |

(Continued)

OTHER PUBLICATIONS

Office Action, issued by the State Intellectual Property Office dated May 14, 2020, in connection with Chinese Patent Application No. 201780079610.7.
Office Action, issued by the Korean Intellectual Property Office dated Aug. 6, 2020, in connection with Korean Patent Application No. 10-2019-7017609.
Office Action, issued by the Japanese Patent Office dated Dec. 8, 2020, in connection with Japanese Patent Application No. 2018-557566.
Office Action, issued by the Japanese Patent Office dated May 7, 2020, in connection with Japanese Patent Application No. 2018-557566.
International Search Report Issued in PCT/JP2017/037352 dated Nov. 21, 2017.

(Continued)

*Primary Examiner* — Z. Jim Yang
(74) *Attorney, Agent, or Firm* — Edwards Neils LLC; Jean C. Edwards, Esq.

(57) ABSTRACT

An optical film has a base material and a hardcoat layer, in which a pencil hardness is 2H or higher, the number of times of folding endurance measured by an MIT tester is 1000 or more, an incident ray is made incident on the optical film from −60° with respect to a normal direction of the optical film, an angle width within which 10% of outgoing ray peak intensity is obtained is 6° or less, and an intensity of outgoing ray at 50° from the normal direction is 1% or less of the outgoing ray peak intensity. A method for manufacturing an optical film has a step of applying a hardcoat layer forming composition to a base material to provide a coating film, and a step of curing the coating film while bringing the coating film into contact with one smooth metal roll.

16 Claims, No Drawings

(56) References Cited

FOREIGN PATENT DOCUMENTS

| | | | |
|---|---|---|---|
| JP | 2015-069058 A | 4/2015 |
| JP | 2016-193600 A | 11/2016 |
| JP | 2017-508828 A | 3/2017 |
| WO | 2013/036220 A1 | 3/2013 |
| WO | 2015-146655 A1 | 10/2015 |
| WO | 2015/175390 A1 | 11/2015 |
| WO | 2016/152871 A1 | 9/2016 |

OTHER PUBLICATIONS

Written Opinion Issued in PCT/JP2017/037352 dated Nov. 21, 2017.
International Preliminary Report on Patentability Issued in PCT/JP2017/037352 dated Jun. 25, 2019.
Office Action, issued by the Korean Intellectual Property Office dated Jan. 13, 2021, in connection with Korean Patent Application No. 10-2019-7017609.
Office Action, issued by the Japanese Patent Office dated Aug. 3, 2021, in connection with Japanese Patent Application No. 2018-557566.

* cited by examiner

OPTICAL FILM AND METHOD FOR MANUFACTURING OPTICAL FILM

CROSS-REFERENCE TO RELATED APPLICATIONS

This application is a Continuation of PCT International Application No. PCT/JP2017/037352 filed on Oct. 16, 2017, which was published under PCT Article 21(2) in Japanese, and which claims priority under 35 U.S.C § 119(a) to Japanese Patent Application No. 2017-101153 filed on May 22, 2017, Japanese Patent Application No. 2017-022603 filed on Feb. 9, 2017, and Japanese Patent Application No. 2016-250146 filed on Dec. 22, 2016. The above applications are hereby expressly incorporated by reference, in their entirety, into the present application.

BACKGROUND OF THE INVENTION

1. Field of the Invention

The present invention relates to an optical film and a method for manufacturing an optical film.

2. Description of the Related Art

In an image display device such as a display device using a cathode ray tube (CRT), a plasma display (PDP), an electroluminescent display (ELD), a fluorescent display (VFD), a field emission display (FED), and a liquid crystal display (LCD), it is suitable to provide an optical film (hardcoat film) having a hardcoat layer on a base material in order to prevent scratches on the display surface.

For example, JP2010-000739A discloses a laminate with a hardcoat layer which includes a hardcoat layer containing at least two kinds of inorganic particles having different average particle diameters, and a metal oxide layer laminated in this order on a resin base material. In addition, JP2010-000739A discloses that it is preferable to increase the filling rate of the inorganic particles by performing a calender treatment after forming the hardcoat layer and before forming the metal oxide layer on the resin base material.

SUMMARY OF THE INVENTION

In recent years, for example, in a smartphone or the like, there has been an increasing demand for a flexible display, and along with this, an optical film that is less likely to be breakable even when repeatedly folded (excellent in repetitive folding resistance) has been strongly required. In this case, from the viewpoint of flexibility, as a base material of the optical film, it may be considered to use a resin base material instead of a glass base material. However, in a case of using a resin base material, compared to a case of using a glass base material, there is a problem in that, particularly, with respect to reflection characteristics, a luxurious feeling is deteriorated (glass-like reflection characteristics cannot be obtained). Even in the optical film having a resin base material and a hardcoat layer described in JP2010-000739A, it is found that both repetitive folding resistance and glass-like reflection characteristic are not sufficient.

An object of the present invention is to provide an optical film having high hardness, excellent repetitive folding resistance, and glass-like reflection characteristics, and a method for manufacturing the optical film.

The present inventors have intensively investigated and have found that the above problems can be solved by the following means.

<1>
An optical film comprising: a base material; and a hardcoat layer,
in which a pencil hardness measured according to JIS K 5600-5-4:1999 is 2H or higher,
the number of times of folding endurance measured by an MIT tester according to JIS P 8115:2001 is 1000 or more, and
in a case where an incident ray is made incident on the optical film from −60° with respect to a normal direction of the optical film, an angle width within which 10% of outgoing ray peak intensity is obtained is 6° or less, and an intensity of an outgoing ray at 50° from the normal direction is 1% or less of the outgoing ray peak intensity.

<2>
The optical film according to <1>, in which a surface roughness of an outermost surface on a side on which the hardcoat layer is laminated is 5 nm or less.

<3>
The optical film according to <1> or <2>, in which a surface roughness of an outermost surface on a side on which the hardcoat layer is laminated is 2 nm or less.

<4>
The optical film according to any one of <1> to <3>, in which the hardcoat layer includes inorganic particles, and particle diameters of the inorganic particles have a single distribution.

<5>
The optical film according to <4>, in which a filling rate of the inorganic particles in the hardcoat layer is 55% by volume or less.

<6>
The optical film according to any one of <1> to <5>, further comprising: a scratch resistant layer on a surface of the hardcoat layer opposite to the base material.

<7>
The optical film according to any one of <1> to <6>, in which the number of times of folding endurance measured by an MIT tester according to JIS P 8115:2001 is 10000 or more.

<8>
The optical film according to any one of <1> to <7>, in which the pencil hardness measured according to JIS K 5600-5-4:1999 is 4H or higher.

<9>
A method for manufacturing an optical film including a base material, and a hardcoat layer, in which a pencil hardness measured according to JIS K 5600-5-4:1999 is 2H or higher, the number of times of folding endurance measured by an MIT tester according to JIS P 8115:2001 is 1000 or more, an incident ray is made incident on the optical film from −60° with respect to a normal direction of the optical film, an angle width within which 10% of outgoing ray peak intensity is obtained is 6° or less, and an intensity of an outgoing ray at 50° from the normal direction is 1% or less of the outgoing ray peak intensity, the method comprising:
(i-1) applying a hardcoat layer forming composition to the base material to provide a coating film; and
(iii-1) curing the coating film while bringing the coating film into contact with one smooth metal roll.

<10>

The method for manufacturing an optical film according to <9>, in which a curing rate of the coating film immediately before the step (iii-1) is 20% or less.

<11>

The method for manufacturing an optical film according to <9> or <10>, further comprising:

between the steps (i-1) and (iii-1), (ii-1) curing a surface layer of the coating film to set a curing rate of the surface layer of the coating film to 50% or more.

<12>

The method for manufacturing an optical film according to any one of <9> to <11>, in which a surface roughness of the metal roll in the step (iii-1) is 40 nm or less.

<13>

A method for manufacturing an optical film including a base material, and a hardcoat layer, in which a pencil hardness measured according to JIS K 5600-5-4:1999 is 2H or higher, the number of times of folding endurance measured by an MIT tester according to JIS P 8115:2001 is 1000 or more, an incident ray is made incident on the optical film from −60° with respect to a normal direction of the optical film, an angle width within which 10% of outgoing ray peak intensity is obtained is 6° or less, and an intensity of an outgoing ray at 50° from the normal direction is 1% or less of the outgoing ray peak intensity, the method comprising:

(i-2) applying a hardcoat layer forming composition to the base material to provide a coating film;

(ii-2) curing the coating film; and (iii-2) performing a calender treatment.

<14>

The method for manufacturing an optical film according to <13>, in which the step (ii-2) is setting a curing rate of the coating film to 10% to 80%.

<15>

The method for manufacturing an optical film according to <13> or <14>, in which the calender treatment in the step (iii-2) is performed using two rolls, a line speed is 20 m/min or more, a temperature of at least one roll is 80° C. or higher, a nip pressure is 100 kg/cm or higher, and the number of nips is 1 or more.

<16>

The method for manufacturing an optical film according to any one of <13> to <15>, in which the calender treatment in the step (iii-2) is performed using two rolls, one of the two rolls close to the coating film is a metal roll, and a surface roughness of the metal roll is 40 nm or less.

According to the present invention, it is possible to provide an optical film having high hardness, excellent repetitive folding resistance, and glass-like reflection characteristics, and a method for manufacturing the optical film.

DESCRIPTION OF THE PREFERRED EMBODIMENTS

Hereinafter, embodiments for carrying out the present invention will be described in detail, but the present invention is not limited thereto. In the present specification, the expression "(numerical value 1) to (numerical value 2)" represents the meaning of "(numerical value 1) or more and (numerical value 2) or less" in a case where the numerical value represents a physical property value, a characteristic value or the like. In addition, the term "(meth)acrylate" represents at least one of acrylate or methacrylate, the term "(meth)acrylic" represents at least one of acrylic or methacrylic, and the term "(meth)acryloyl" represents at least one of aclyloyl or methacryloyl,

[Optical Film]

An optical film according to an embodiment of the present invention is an optical film having a base material, and a hardcoat layer.

in which a pencil hardness measured according to JIS K 5600-5-4:1999 is 2H or higher, the number of times of folding endurance measured by an MIT tester according to JIS P 8115:2001 is 1000 or more, and an incident ray is made incident on the optical film from −60° with respect to a normal direction of the optical film, an angle width within which 10% of outgoing ray peak intensity is obtained is 6° or less, and the intensity of an outgoing ray at 50° from the normal direction is 1% or less of the outgoing ray peak intensity.

<Physical Properties of Optical Film>

First, the physical properties of the optical film according to the embodiment of the present invention will be described.

(Pencil Hardness)

From the viewpoint of film hardness, the pencil hardness of the optical film according to the embodiment of the present invention at a load of 500 g measured according to Japanese Industrial Standards (JIS) K 5600-5-4:1999 is 2H or higher, preferably 3H or higher, more preferably 4H or higher, and even more preferably 5H or higher.

(Number of Times of Folding Endurance)

The number of times of folding endurance of the optical film according to the embodiment of the present invention measured by an MIT tester according to JIS P 8115:2001 is 1000 or more, preferably 5000 or more, and more preferably 10000 or more.

(Reflection Characteristics)

In the optical film according to the embodiment of the present invention, an incident ray is made incident on the optical film from −60° with respect to the normal direction of the optical film, an angle width within which 10% of outgoing ray peak intensity is obtained is 6° or less, and the intensity of an outgoing ray at 50° from the normal direction is 1% or less of the outgoing ray peak intensity.

The present inventors have investigated the reflection characteristics of an optical film using a resin base material and have found that glass-like reflection characteristics can be obtained in a case where the above characteristics are satisfied.

It is preferable that an incident ray is made incident on the optical film from −60° with respect to the normal direction, an angle width within which 10% of outgoing ray peak intensity is obtained is 4° or less, and the intensity of an outgoing ray at 50° from the normal direction is 0.7% or less of the outgoing ray peak intensity, and it is more preferable that an incident ray is made incident on the optical film from −60° with respect to the normal direction of the optical film, an angle width within which 10% of outgoing ray peak intensity is obtained is 3° or less, and the intensity of an outgoing ray at 50° from the normal direction is 0.5% or less of the outgoing ray peak intensity.

The reflection characteristics are measured using a three-dimensional gonio-spectrophotometric color measurement system GCMS-3B (Murakami Color Research Laboratory, Co., Ltd.). Specifically, an incident ray is made incident on the optical film from −60° with respect to the normal direction (assumed to be 0°) of the optical film, and reflected light is measured in a range from 0° to 80°. The angle width within which 10% of outgoing ray peak intensity is obtained is set to 0, and a value obtained by multiplying a value obtained by dividing the intensity of the outgoing ray at 50° by the outgoing ray peak intensity by 100 is set to I (%).

(Surface Roughness)

In the optical film according to the embodiment of the present invention, the surface roughness (Ra) at the outermost surface on the side where the hardcoat layer is laminated (on the side of the hardcoat layer opposite to the base material) is preferably 5 nm or less and more preferably 2 nm or less. By setting Ra to 5 nm or less, the reflection characteristics can be set to be in a preferable range.

Ra can be measured with a normal optical interferometer, and in the present invention, Ra is measured using Vertscan 2.0 (manufactured by Ryoka Systems Inc.).

<Hardcoat Layer>

The hardcoat layer of the optical film according to the embodiment of the present invention will be described.

The hardcoat layer preferably contains a resin.

(Resin)

It is preferable that the resin contained in the hardcoat layer is a polymer (cured product) obtained by polymerizing a curable compound by irradiation with ionizing radiation or heating.

—Curable Compound—

The curable compound is preferably a compound having a polymerizable functional group (preferably, an ionizing radiation curable compound). As the compound having a polymerizable functional group, various monomers, oligomers and polymers can be used, and as the polymerizable functional group (polymerizable group), a photopolymerizable, electron beam polymerizable, or radiation polymerizable functional group is preferable. Among these, a photopolymerizable functional group is preferable.

Examples of the photopolymerizable functional group include polymerizable unsaturated groups (carbon-carbon unsaturated double bond group) such as a (meth)acryloyl group, a vinyl group, a styryl group, and an allyl group, and among these, a (meth)acryloyl group is preferable.

Specific examples of the compound having a polymerizable unsaturated group include (meth)acrylic acid diesters of alkylene glycol such as neopentyl glycol acrylate, 1,6-hexanediol(meth)acrylate and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol such as pentaerythritol di(meth)acrylate; and (meth)acrylic acid diesters of ethylene oxide or propylene oxide adduct such as 2,2-bis{4-(acryloxy.diethoxy) phenyl}propane and 2-2-bis{4-(acryloxy.polypropoxy) phenyl}propane.

Further, epoxy (meth)acrylates, urethane (meth)acrylates, and polyester (meth)acrylates may also be preferably used as a photopolymerizable monomer Among these, esters of a polyhydric alcohol and (meth) acrylic acid are preferable. It is more preferable to contain at least one polyfunctional monomer having three or more (meth)acryloyl groups in one molecule thereof.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa (meth)acrylate, 1,2,3-cyclohexane tetramethacrylate, polyurethane polyacrylate, polyester polyacrylate, and caprolactone-modified tris(acryloxyethyl) isocyanurate.

Specific examples of the polyfunctional acrylate-based compound having a (meth)acryloyl group include esterification products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20. KAYARAD DPCA-30, KAYARAD DPCA-60, KAYARAD GPO-303 manufactured by Nippon Kayaku Co., Ltd., and V#3PA, V#400, V#36095D, V#1000, and V#1080 manufactured by Osaka Organic Chemical Industry Ltd. A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B. SHIKOH UV-3200B, SHIKOH UV-3210EA, SHIKOH UV-3310EA, SHIKOH UV-3310B. SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, SHIKOH UV-2750B (manufactured by Nippon Synthetic Chem Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4858 (manufactured by Daicel-UCB Corporation), HIGH-COAP AU-2010 and UNIDIC AU-2020 (manufactured by Tokushiki Co., Ltd.), ARONIX M-1960 (manufactured by Toagosei Co., Ltd.), and ARTRESIN UN-3320HA, UN-3320HC, UN-3320HS, UN-904, HDP-4T, and U15HA (manufactured by Shin-Nakamura Chemical Co., Ltd.) and a trifunctional or higher functional polyester compound such as ARONIX M-8100, M-8030, and M-9050 (manufactured by Toagosei Co., Ltd.), and KRM-8307 (manufactured by Daicel Cytec Co., Ltd.) can be suitably used. Particularly, DPHA and PET-30 are preferably used.

Examples thereof include a resin having three or more polymerizable functional groups, for example, a polyester resin having a relatively low molecular weight, a polyether resin, an acrylic resin, an epoxy resin, an urethane resin, an alkyd resin, a spiroacetal resin, a polybutadiene resin, and a polythiol polyene resin, or an oligomer or a prepolymer of a polyfunctional compound such as polyhydric alcohol.

In addition, compounds disclosed in JP2005-076005A and JP2005-036105A, dendrimers such as SIRIUS-501 and SUBARU-501 (manufactured by Osaka Organic Chemical Industry Ltd.), and norbornene ring-containing monomers disclosed in JP2005-060425A can be used.

Two or more kinds of the compounds having a polymerizable functional group may be used in combination. The polymerization of these compounds having a polymerizable functional group can be performed by irradiation with ionizing radiation or heating under the presence of a photoradical initiator or a thermal radical initiator.

—Inorganic Particles—

It is preferable that the hardcoat layer of the optical film according to the embodiment of the present invention contains inorganic particles.

The hardness can be increased by adding inorganic particles to the hardcoat layer. Examples of the inorganic particles include silicon dioxide particles, titanium dioxide particles, zirconium oxide particles, and aluminum oxide particles.

The surface of the inorganic particle may be treated with a surface modifier including an organic segment. The surface modifier preferably has a functional group forming a bond with inorganic particles or absorbable to inorganic particles and a functional group having high affinity with organic components in the same molecule. The surface modifier having a functional group bonded with or absorbable to inorganic particles is preferably a metal alkoxide surface modifier such as silane, aluminum, titanium, and zirconium, or a surface modifier having an anionic group such as a phosphoric acid group, a sulfate group, a sulfonic acid group, and a carboxylic acid group. The functional group having high affinity with organic components may be a functional group simply having the same hydrophilicity or hydrophobicity as organic components, but is preferably a functional group capable of chemically bonding with organic components and particularly preferably an ethylenically unsaturated double bond group or a ring-opening polymerizable group. In the present invention, a preferable inorganic particle surface modifier is a curable resin having a metal alkoxide or an anionic group and an ethylenically unsaturated double bond group or a ring opening polymerizable group in the same molecule.

Typical examples of these surface modifiers include the following unsaturated double bond-containing coupling agents, phosphoric acid group-containing organic curable resins, sulfuric acid group-containing organic curable resins, and carboxylic acid group-containing organic curable resins.

S-1 $H_2C=C(X)COOC_3H_6Si(OCH_3)_3$
S-2 $H_2C=C(X)COOC_2H_4OTi(OC_2H_5)_3$
S-3 $H_2C=C(X)COOC_2H_4OCOC_5H_{10}OPO(OH)_2$
S-4 $(H_2C=C(X)COOC_2H_4OCOC_5H_{10}O)_2POOH$
S-5 $H_2C=C(X)COOC_2H_4OSO_3H$
S-6 $H_2C=C(X)COO(C_5H_{10}COO)_2H$
S-7 $H_2C=C(X)COOC_5H_{10}COOH$
S-8 $CH_2CH(O)CH_2OC_3H_6Si(OCH_3)_3$
(X represents a hydrogen atom or $CH_3$)

The surfaces of these inorganic particles are preferably modified in a solution. In a case where the inorganic particles are mechanically finely dispersed, the inorganic particles may be dispersed together with a surface modifier, or the surface modifier may be added and stirred after the inorganic particles are finely dispersed, or furthermore, the inorganic particles may be subjected to surface modification before being finely dispersed (warming, heating after drying, or pH adjustment is carried out, as necessary), and then finely dispersed. As a solution in which the surface modifier is dissolved, an organic solvent having high polarity is preferable. Specific examples thereof include known solvents such as alcohols, ketones, and esters.

The average primary particle diameter of the inorganic particles is preferably 1 to 100 nm, more preferably 2 to 20 nm, and even more preferably 3 to 15 nm.

The average primary particle diameter of the inorganic particles can be obtained from electron micrographs.

From the viewpoint of a reduction in the intensity of an outgoing ray at 50°, it is preferable that the inorganic particles have a single particle diameter distribution. Here, the single distribution means that there is one peak in the particle diameter distribution of the inorganic particles.

The inorganic particles may be used singly or in combination of two or more kinds thereof, but from the viewpoint of a reduction in intensity of an outgoing ray at 50°, it is preferable the inorganic particles are used singly.

From the viewpoint of the reflection characteristics and smoothness of the optical film, the filling rate of the inorganic particles in the hardcoat layer is preferably 55% by volume or less, more preferably 40% by volume or less, even more preferably 35% by volume or less, and particularly preferably 30% by volume or less.

A sample surface is scraped off with a scraper, 10 g or more of the hardcoat layer is collected, and then the mass is measured. The collected hardcoat layer is heated at 600° C. for 1 hour under a nitrogen atmosphere to evaporate the resin, the inorganic particles are collected, and then the mass is measured. The specific gravity of resin is set to 1.2, and as the specific gravity of the inorganic particles, an appropriate value is used to obtain the volume filling rate of the inorganic particles in the hardcoat layer.

—Other Additives—

The hardcoat layer may contain components other than those described above, and may contain, for example, a dispersant, a leveling agent, an antifouling agent and the like.

(Film Thickness)

The film thickness of the hardcoat layer is not particularly limited and is preferably 1 to 10 μm, more preferably 1.5 to 8 μm, and even more preferably 2 to 5 μm.

<Base Material>

The base material of the optical film according to the embodiment of the present invention will be described.

The light transmittance of the base material in the visible light range is preferably 70% or higher and more preferably 80% or higher.

The base material preferably includes a polymer resin.

(Polymer Resin)

As the polymer resin, a polymer excellent in optical transparency, mechanical strength, heat stability and the like is preferable.

Examples thereof include polycarbonate-based polymers, polyester-based polymers such as polyethylene terephthalate (PET) and polyethylene naphthalate (PEN), and styrene-based polymers such as polystyrene and acrylonitrile-styrene copolymers (AS resins). In addition, examples thereof also include polyolefins such as polyethylene and polypropylene, polyolefin-based polymers such as norbornene-based resins and ethylene-propylene copolymers, vinyl chloride-based polymers, amide-based polymers such as nylon and aromatic polyamides, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, acrylate-based polymers, polyoxymethylene-based polymers, epoxy-based polymers, cellulose-based polymers typified by triacetyl cellulose, copolymers of the above-described polymers, and polymers obtained by mixing the above-described polymers.

Particularly, amide-based polymers such as aromatic polyamides and imide-based polymers can be preferably used as the base material since the number of times of breakage folding endurance measured using an MIT tester according to JIS P 8115:2001 is large and the hardness is also relatively high. For example, an aromatic polyamide as in Example 1 of JP5699454B, and polyimides described in JP2015-508345A and JP2016-521216A can be preferably used as the base material.

In addition, the base material can also be formed as a cured layer of an ultraviolet curing type and thermosetting type resin such as acrylic, urethane-based, acrylic urethane-based, epoxy-based, and silicone-based resins.

(Softening Material)

The base material may contain a material that further softens the polymer resin. The softening material refers to a compound that improves the number of times of breakage folding endurance and a rubber elastic body, a brittleness improver, a plasticizer, a sliding ring polymer, and the like can be used as the softening material.

As the softening material, specifically, softening materials described in paragraphs <0051> to <0114> in JP2016-167043A can be suitably used.

The softening material may be singly used mixed with the polymer resin and a plurality of softening materials may be appropriately mixed in combination. Otherwise, without being mixed with a resin, only the softening material may be used singly or a plurality of softening materials are used in combination, as the base material.

An amount of these softening materials mixed is not particularly limited, and for example, 10 parts by mass the softening material may be mixed with respect to 100 parts by mass of the polymer resin. That is, the base material may have a sufficient number of times of breakage folding endurance and may be constituted of the polymer resin alone, the softening material may be mixed, and all may be the softening material (100%) so as to have a sufficient number of times of breakage folding endurance.

(Other Additives)

In the base material, various additives (for example, an ultraviolet absorbing agent, matte agent, an antioxidant, a peeling accelerator, and a retardation (optical anisotropy) regulator) can be added according to the usage can be added. These may be solid or may be an oil product. That is, the melting point or the boiling point thereof is not particularly limited. With respect to the timing of adding the additive, adding may be performed at any timing in a step of producing the base material, and a step of adding the additive and performing preparation may be further performed in the material preparation step. Further, the amounts of the respective materials added are not particularly limited as long as the function is exhibited.

As other additives, additives described in paragraphs <0117> to <0122> of JP2016-167043A can be suitably used.

The above additives may be used singly or in combination of two or more kinds thereof.

(Ultraviolet Absorbing Agent)

Examples of the ultraviolet absorbing agent include a benzotriazole compound, a triazine compound, and a benzoxazine compound. Here, the benzotriazole compound is a compound having a benzotriazole ring, and specific examples thereof include various benzotriazole-based ultraviolet absorbing agents described in paragraph 0033 of JP2013-111835A. The triazine compound is a compound having a triazine ring, and specific examples thereof include various triazine-based ultraviolet absorbing agents described in paragraph 0033 of JP2013-111835A. As the benzoxazine compound, for example, compounds described in paragraph 0031 of JP2014-209162A can be used. The content of the ultraviolet absorbing agent in the base material is, for example, about 0.1 to 10 parts by mass with respect to 100 parts by mass of the resin included in the base material, but is not particularly limited. In addition, regarding the ultraviolet absorbing agent, paragraph 0032 of JP2013-111835A can also be referred to. In the present invention, an ultraviolet absorbing agent having high heat resistance and low volatility is preferable. Examples of the ultraviolet absorbing agent include UVSORB 101 (manufactured by Fujifilm Fine Chemicals Co., Ltd.), TINUVIN 360, TINUVIN 460, and TINUVIN 1577 (manufactured by BASF SE), and LA-F70, LA-31, and LA-46 (manufactured by ADEKA CORPORATION).

From the viewpoint of transparency, it is preferable that the difference in refractive index between the softening material used for the base material, various additives, and the polymer resin is small in the base material.

(Thickness of Base Material)

The thickness of the base material is more preferably 100 µm or less, even more preferably 60 µm or less, and most preferably 50 µm or less. In a case where the thickness of the base material is thin, the difference in curvature between the front surface and the rear surface at the time of folding becomes small, cracks and the like are less likely to occur, and breakage of the base material does not occur even in a case of a plurality of times of folding. On the other hand, from the viewpoint of ease of handling of the base material, the thickness of the base material is preferably 10 µm or more and more preferably 15 µm or more. From the viewpoint of reducing the thickness of an image display device in which the optical film is incorporated, the total thickness of the optical film is preferably 70 µm or less and more preferably 50 µm or less.

(Method for Producing Base Material)

The base material may be formed by thermally melting a thermoplastic polymer resin or may be formed into a film by solution casting (solvent casting method) from a solution in which a polymer is homogeneously dissolved. In a case of thermal melting film formation, the softening material and various additives described above can be added at the time of thermal melting. On the other hand, in a case where the base material is produced by solution casting, the softening material and various additives described above can be added to a polymer solution (hereinafter, also referred to as a dope) in each preparation step. In addition, with respect to the timing of the addition, adding may be performed at any timing in a dope preparation step, but a step of adding the additive and performing preparation may be performed in the final preparation step of the dope preparation step.

<Other Layers>

The optical film according to the embodiment of the present invention may have layers other than the hardcoat layer.

For example, it is preferable to further provide a scratch resistant layer is on the outermost surface of the hardcoat layer of the optical film opposite to the base material and thus scratch resistance can be improved.

(Scratch Resistant Layer)

As the scratch resistant layer, a layer containing a cured product of a crosslinking compound having three or more crosslinking groups in one molecule in an amount of 80% by mass or more with respect to the total mass of the scratch resistant layer is preferable.

The crosslinking compound having three or more crosslinking groups in one molecule may be a crosslinking monomer, a crosslinking oligomer or a crosslinking polymer. In a case where the number of crosslinking groups in one molecule of the crosslinking compound is 3 or more, a dense three-dimensional crosslinked structure is easily formed, and even in a case where a crosslinking compound having a small crosslinking group equivalent (in a case of having a (meth)acryloyl group as a crosslinking group, it is generally called an acryl equivalent) is used, the indentation hardness of the scratch resistant layer can be increased. The indentation hardness of the scratch resistant layer is preferably 300 MPa or more.

The content of the cured product of the crosslinking compound having three or more crosslinking groups in one molecule is preferably 80% by mass or more, more preferably 85% by mass or more, and even more preferably 90% by mass or more with respect to the total mass of the scratch resistant layer.

As the crosslinking group, a (meth)acryloyl group, an epoxy group, or an oxetanyl group is preferable, a (meth)acryloyl group or an epoxy group is more preferable, and a (meth)acryloyl group is most preferable.

As the crosslinking monomer having three or more crosslinking groups in one molecule, an ester of a polyhydric alcohol and (meth)acrylic acid and the like may be used. Specific examples thereof include pentaerythritol tri(meth)acrylate, pentaerythritol tetra(meth) acrylate, trimethylolpropane tri(meth)acrylate, trimethylolethane tri(meth)acrylate, ditrimethylolpropane tetra(meth)acrylate, dipentaerythritol tetra(meth)acrylate, dipentaerythritol pentaacrylate, dipentaerythritol hexaacrylate, and pentaerythritol hexa(meth)acrylate. Form the viewpoint of high crosslinking, pentaerythritol triacrylate, pentaerythritol tetraacrylate, or dipentaerythritol pentaacrylate, dipentaerythritol hexaacrylate, or a mixture thereof is preferable.

The film thickness of the scratch resistant layer is preferably 350 nm or less.

[Method for Manufacturing Optical Film]

A method for manufacturing an optical film according to an embodiment of the present invention will be described.

The method for manufacturing an optical film according to an embodiment of the present invention preferably includes the following aspect (A) and the following aspect (B).

Aspect (A):

A method for manufacturing an optical film having a base material and a hardcoat layer, in which a pencil hardness measured according to JIS K 5600-5-4:1999 is 2H or higher, the number of times of folding endurance measured by an MIT tester according to JIS P 8115:2001 is 1000 or more, and an incident ray is made incident on the optical film from −60° with respect to a normal direction of the optical film, an angle width within which 10% of outgoing ray peak intensity is obtained is 6° or less, and an intensity of outgoing ray at 50° from the normal direction is 1% or less of the outgoing ray peak intensity, the method including:

(i-1) applying a hardcoat layer forming composition to the base material to provide a coating film; and (iii-1) curing the coating film while bringing the coating film into contact with one smooth metal roll.

Aspect (B):

A method for manufacturing an optical film having a base material and a hardcoat layer, in which a pencil hardness measured according to JIS K 5600-5-4:1999 is 2H or higher, the number of times of folding endurance measured by an MIT tester according to JIS P 8115:2001 is 1000 or more, and an incident ray is made incident on the optical film from −60° with respect to a normal direction of the optical film, an angle width within which 10% of outgoing ray peak intensity is obtained is 6° or less, and an intensity of outgoing ray at 50° from the normal direction is 1% or less of the outgoing ray peak intensity, the method including:

(i-2) applying a hardcoat layer forming composition to the base material to provide a coating film;

(ii-2) curing the coating film, and (iii-2) performing a calender treatment.

<<Aspect (A)>>

The aspect (A) of the method for manufacturing an optical film according to the embodiment of the present invention will be described.

<Step (i-1)>

The step (i-1) is a step of applying a hardcoat layer forming composition to the base material to provide a coating film.

The base material is as described above.

The hardcoat layer forming composition is a composition for forming the above-mentioned hardcoat layer.

The hardcoat layer forming composition is generally in the form of liquid and preferably contains a curable compound for forming the resin included in the above-mentioned hardcoat layer. In addition, the hardcoat layer forming composition is preferably prepared by dissolving or dispersing a curable compound and various additives and a polymerization initiator as necessary in an appropriate solvent. In this case, the concentration of the solid content is generally about 10% to 90% by mass, preferably 20% to 80% by mass, and particularly preferably about 40% to 70% by mass.

—Polymerization Initiator—

The hardcoat layer forming composition may include a polymerization initiator.

In a case where the curable compound is a photopolymerizable compound, the hardcoat layer forming composition preferably includes a photopolymerization initiator.

Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins. Specific examples of the photopolymerization initiator, preferable embodiments, commercially-available products, and the like are described in paragraphs [0133] to [0151] of JP2009-098658A, and can also be suitably adopted in the present invention.

Various examples are also described in "Latest UV Curing Technology" {Technical Information Institute Co., Ltd.}, page 159, (1991), and "Ultraviolet Curing System" Sogo Gijutsu Center, pages 65 to 148 (1989), and these are useful in the present invention.

The content of the polymerization initiator in the hardcoat layer forming composition is preferably 0.5% to 8% by mass and more preferably 1% to 5% by mass with respect to the total solid content of the hardcoat layer forming composition for the reason that the content is set to be sufficiently large for polymerizing the polymerizable compound contained in the hardcoat layer forming composition and sufficiently small for preventing an excessive increase of initiation points.

—Solvent—

The solvent is not particularly limited and an organic solvent is preferable. For example, a solvent having a boiling point of 200° C. or lower at atmospheric pressure may be used. Specifically, alcohols, ketones, ethers, esters, hydrocarbons, and amides are used and these may be used singly or in combination of two or more kinds thereof. Among these, alcohols, ketones, ethers, and esters are preferable.

Examples of alcohols include methanol, ethanol, isopropyl alcohol, isobutanol, n-butanol, tert-butanol, ethoxyethanol, butoxyethanol, diethylene glycol monoethyl ether, benzyl alcohol, and phenethyl alcohol. Examples of ketones include acetone, methyl ethyl ketone, methyl isobutyl ketone, and cyclohexanone. Examples of ethers include dibutyl ether, and propylene glycol monoethyl ether acetate. Examples of esters include ethyl acetate, butyl acetate, and ethyl lactate. Examples of hydrocarbons include toluene, and xylene. Examples of amides include formamide, dimethylacetamide, and N-methylpyrrolidone. Among these, isopropyl alcohol, ethoxyethanol, butoxyethanol, diethylene glycol monoethyl ether, methyl ethyl ketone, methyl isobutyl ketone, cyclohexanone, propylene glycol monoethyl ether acetate, butyl acetate, and ethyl acetate are preferable.

A method for applying the hardcoat layer forming composition is not particularly limited and a known method can be used. For example, a dip coating method, an air knife coating method, a curtain coating method, a roller coating method, a wire bar coating method, a gravure coating method or a die coating method can be used.

<Step (iii-1)>

The step (iii-1) is a step of curing the coating film obtained in the step (i-1) while bringing the coating film into contact with one smooth metal roll.

By curing the coating film while bringing the coating film into contact with one smooth metal roll, it is possible to form a hardcoat layer having a smooth surface.

As the smooth metal roll, it is possible to suitably use chromium molybdenum steel subjected to hard chrome plating and mirror-finished by polishing, or the like.

The surface roughness (Ra) of the smooth metal roll is preferably 40 nm or less, more preferably 10 nm or less, and even more preferably 5 nm or less. The surface roughness of the metal roll is preferably set to 40 nm or less since the surface smoothness of the obtained hardcoat layer is improved and desired reflection characteristics are obtained. In the present specification, in a case where there is a catalog value, the surface roughness (Ra) of the metal roll is used from the catalog value, and in a case where there is no catalog value, the surface roughness is obtained using a surface roughness measuring machine Surf test (manufactured by Mitutoyo Corporation).

The surface temperature of the metal roll in a case of bringing the coating film into contact with the metal roll is not particularly limited and from the viewpoint of accelerating curing of the hardcoat layer, it is preferable to set the surface temperature to be higher than room temperature (25° C.) in some cases.

In a case where the curable compound included in the coating film is an ionizing radiation curable compound, it is preferable that the coating film is cured by being irradiated with ionizing radiation from the base material side.

The kind of the ionizing radiation is not particularly limited, and examples thereof include X-rays, electron beams, ultraviolet rays, visible light, infrared rays, and the like. Ultraviolet rays are preferably used. For example, in a case where the coating film is ultraviolet-curable, the curable compound is preferably cured by being irradiated with ultraviolet rays at an irradiation dose of 10 mJ/cm$^2$ to 1000 mJ/cm$^2$ using an ultraviolet lamp. The irradiation dose is more preferably 50 mJ/cm$^2$ to 1000 mJ/cm$^2$ and even more preferably 100 mJ/cm$^2$ to 500 mJ/cm$^2$. As the kind of the ultraviolet lamp, a metal halide lamp, a high pressure mercury lamp, or the like is suitably used.

The oxygen concentration at the time of curing is preferably 0% to 1.0% by volume, more preferably 0% to 0.1% by volume, and most preferably 0% to 0.05% by volume. By setting the oxygen concentration at the time of curing to be lower than 1.0% by volume, the compound is less likely to be affected by curing inhibition due to oxygen and a strong film is formed.

The treatment speed in the step (iii-1) is preferably 2 to 40 m/min and more preferably 2 to 30 m/min. By setting the treatment speed to 2 m/min or higher, high productivity can be realized, and by setting the treatment speed to 40 m/min or lower, the coating film can be sufficiently cured by ionizing radiation.

The curing rate of the coating film immediately before the step (iii-1) is preferably 20% or less. That is, the step (iii-1) is preferably a step of curing the coating film with a curing rate of 20% or less. Thus, the smooth surface shape of the metal roll is easily transferred to the coating film by the step (iii-1) and a smooth hardcoat layer is easily obtained. The curing rate of the coating film immediately before the step (iii-1) is preferably 10% or less and even more preferably 5% or less.

The curing rate is obtained as follows.

Curing rate is:

(1−Number of remaining polymerizable functional groups after curing/number of polymerizable functional groups before curing)×100%, and measured in the following method.

Specifically, using NICOLET 6700 FT-IR manufactured by Thermo electron corporation, the peak height (808 cm$^{-1}$) of the polymerizable carbon-carbon unsaturated double bond is obtained from transmission IR measurement. In addition, after photoirradiation, the peak height is obtained in the same manner, and the change rate of the peak height before and after light irradiation is calculated to calculate the curing rate.

It is preferable to provide the following step (iii-1) between the steps (i-1) and (iii-1);

(ii-1) a step of curing a surface layer of the coating film to set the curing rate of the surface layer of the coating film to 50% or more.

The surface layer of the coating film is a region of 0.8 μm from the surface of the coating film opposite to the base material. The curing rate of the surface layer is measured in the same manner as above except that the curing rate is obtained from single reflection IR measurement for this region.

By providing the step of curing the surface layer of the coating film between the steps (i-1) and (iii-1) to set the curing rate of the surface layer of the coating film to 50% or more, a part of the hardcoat layer forming composition for the hardcoat layer as a coating film is less likely to be attached to the metal roll and thus productivity is improved. In the step (ii-1), the curing rate of the surface layer of the coating film is more preferably 60% or more and even more preferably 70% or more.

In this case, the curing rate of the entire coating film immediately before the step (iii-1) is preferably 20% or less as described above.

It is preferable to provide a step of drying the coated surface to which the hardcoat layer forming composition is applied after the step (i-1) and before the step (iii-1). In this case, it is preferable that drying is performed by heating the coated surface to 50° C. to 130° C. and preferably 60° C. to 125° C. for 5 seconds to 5 minutes and preferably 30 seconds to 5 minutes.

The curing of the surface layer of the coating film can be performed by irradiation with ionizing radiation.

In a case where the curing is performed by irradiation with ionizing radiation, the above-mentioned kind of ionizing radiation can be preferably used. The ionizing radiation is preferably radiated from the coating film side. In order to cure the surface layer of the coating film, it is preferable to perform nitrogen or carbon dioxide purging.

<<Aspect (B)>>

The aspect (B) of the method for manufacturing an optical film according to the embodiment of the present invention will be described.

The step (i-2) is the same as the step (i-1) in the above-mentioned aspect (A).

<Step (ii-2)>

The step (ii-2) is a step of curing the coating film obtained in the step (i-2).

The curing can be performed by irradiation with ionizing radiation.

In a case where the curing is performed by irradiation with ionizing radiation, the ionizing radiation described in the above step (iii-1) can be preferably used.

In the step (ii-2), the curing rate of the coating film is preferably 10% to 80%, more preferably 20% to 70%, and even more preferably 30% to 60%.

By setting the curing rate of the coating film to 10% or more in the step (ii-2), the hardcoat layer forming composition is less likely to be attached to a calender roll used in the step (iii-2) and thus productivity can be improved.

In addition, it is preferable to set the curing rate of the coating film in the step (ii-2) to 80% or less from the viewpoint of achieving smoothness by a calender treatment.

The curing rate is measured in the same manner as described above.

<Step (iii-2)>

The step (iii-2) is a step of performing a calender treatment on a laminate having the base material and the cured coating film.

The calender treatment is preferably performed by a calender apparatus. As the calender apparatus, a super calender, gross calender, machine calender, soft calender, or the like is used. The calender treatment is preferably performed using two rolls (calender rolls, rolls having a roll close to the base material and a roll close to the coating film).

Of the two rolls, the roll close to the coating film is preferably a roll formed of metal (metal roll). As the metal roll, a metal roll having a protective layer formed by spraying nickel, chromium, ceramics or the like on the surface of the metal roll may be used, and the surface is preferably polished so as to have specular gloss.

Hereinafter, a case where the roll close to the coating film is a metal roll will be described as an example.

The laminate through the steps (i-2) and (ii-2) is allowed to pass through a nip (gap) between the metal roll and the other roll (which is a roll close to the base material and may be a roll formed of metal), so that the smoothness of the surface of the hardcoat layer can be improved by pressure, shearing force, and heat.

The treatment may be performed without heating the metal roll. However, since the smoothness is further improved, it is preferable to heat the metal roll. The surface temperature of the metal roll is preferably 80° C. and more preferably 90° C. to 120° C.

The linear pressure (nip pressure) of the nip between the metal roll and the other roll during the calender treatment according to the present invention is preferably 100 kg/cm or more and more preferably 200 to 400 kg/cm.

The treatment speed (line speed) of the calender treatment is preferably 20 m/min or higher and more preferably 40 to 80 m/min.

The number of nips is preferably 1 or more and more preferably 7 or less.

The surface roughness of the metal roll is preferably 40 nm or less and more preferably 10 nm or less. The surface roughness is even more preferably 5 nm or less.

It is preferable that after the step (iii-2), the hardcoat layer (coating film) is further cured.

In the aspects (A) and (B), it is preferable that a step of providing a scratch resistant layer is provided after forming the hardcoat layer.

In this case, a scratch resistant layer is preferably provided on the smoothed hardcoat layer. For example, it is preferable that after the above-mentioned step (iii-2), a scratch resistant layer forming composition is applied to the hardcoat layer and cured to form a scratch resistant layer.

EXAMPLES

Hereinafter, the present invention will be described more specifically with reference to examples, but the scope of the present invention is not to be construed as being limited thereby. In addition, "parts" and "%" are on a mass basis unless otherwise specified.

(Production of Base Material S-1)

[Synthesis of Aromatic Polyamide]

674.7 kg of N-methyl-2-pyrrolidone, 10.6 g of anhydrous lithium bromide (manufactured by Sigma-Aldrich Japan K.K.), 33.3 g of 2,2'-ditrifluoromethyl-4,4'-diaminobiphenyl ("TFMB" manufactured by Toray Fine Chemicals Co., Ltd.), and 2.9 g of 4,4'-diaminodiphenylsulfone ("44 DDS" manufactured by Wakayama Seika Kogyo Co., Ltd.) were put into a polymerization tank provided with a stirrer and were cooled to 15° C. in a nitrogen atmosphere, and 18.5 g of terephthalic acid dichloride (manufactured by Tokyo Chemical Industry Co., Ltd.) and 6.4 g of 4,4'-biphenyl dicarbonyl chloride ("4 BPAC" manufactured by Toray Fine Chemical Co., Ltd.) were added in four portions under stirring over 300 minutes. After stirring for 60 minutes, hydrogen chloride generated in the reaction was neutralized with lithium carbonate so as to obtain a polymer solution.

A portion of the polymer solution obtained above was cast on an endless belt at 120° C. by using a T-die so that the final film thickness was 40 μm, was dried so that the polymer concentration became 40% by mass, and was peeled off from the endless belt. Subsequently, the film containing the solvent was stretched 1.1 times in a machine direction (MD) in the atmosphere at 40° C. and was washed with water at 50° C. so as to remove the solvent. Further, the film was stretched 1.2 times in a transverse direction (TD) in a drying furnace at 340° C. to obtain a base material S-1 formed of aromatic polyamide and having a thickness of 40 μm.

[Production of Optical Film]

Hardcoat layer forming compositions (coating liquids) were prepared as shown below and hardcoat layers were formed using the respective hardcoat layer forming compositions to produce optical film samples.

(Preparation of Hardcoat Layer Forming Compositions)

Each component was put into a mixing tank at the composition (parts by mass) shown in Table 1 below, stirred, and filtered through a polypropylene filter having a pore diameter of 0.4 µm to prepare coating liquids A to D.

TABLE 1

| Component\Hardcoat layer forming composition | Coating liquid A | Coating liquid B | Coating liquid C | Coating liquid D |
|---|---|---|---|---|
| DPCA-20 | 52.25 | — | 14.11 | 20.90 |
| SIRIUS-501 | — | 52.25 | — | — |
| Silica 1 | — | — | — | 18.81 |
| Silica 2 | — | — | — | 12.54 |
| Zirconia | — | — | 38.14 | — |
| Toluene | 45.00 | 45.00 | 45.00 | 45.00 |
| IRGACURE 184 | 2.75 | 2.75 | 2.75 | 2.75 |

The unit of the content of each component is parts by mass.
DPCA-20: KAYARAD DPCA-20 manufactured by Nippon Kayaku Co., Ltd.
SIRIUS-501: SIRIUS-501 manufactured by Osaka Organic Chemical Industry Co., Ltd.
Silica 1: silica particles having an average primary particle diameter of 30 nm
Silica 2: silica particles having an average primary particle diameter of 7 nm
Zirconia: zirconia particles having an average primary particle diameter 20 nm (manufactured by CIK NanoTek Corporation)
Solvent: toluene
Polymerization initiator: IRGACURE 184 (manufactured by BASF SE)

Example 1: Production of Optical Film a

The coating liquid A was applied to on the base material S-1 using a gravure coater to obtain a coating film. After drying the coating film at 100° C., while nitrogen purging was performed so that the atmosphere had an oxygen concentration of 1.5% by volume, the coating film was irradiated with ultraviolet rays at an irradiation dose of 20 mJ/cm$^2$ from the coating film side using an air-cooled metal halide lamp (manufactured by Eye Graphics Co., Ltd.) of 20 mW/cm$^2$ and cured. In this case, the curing rate of the coating film was 54%.

Thereafter, a laminate of the base material and the cured coating film was subjected to a calender treatment. The conditions of the calender treatment are shown below.

Kind of roll: hard chrome plated chrome molybdenum steel
Line speed: 50 m/min
Roll temperature: 90° C.
Nip pressure: 300 kg/cm
Number of nips: 1
Surface roughness of roll: 3 nm After the calender treatment, the film was irradiated with ultraviolet rays again. The conditions of the ultraviolet irradiation were such that the oxygen concentration was 100 ppm or less, the irradiance was 160 mW/cm$^2$, the irradiation dose was 300 mJ/cm$^2$. The curing rate of the coating film was 84%.

In this manner, an optical film a was produced. The film thickness of the hardcoat layer was 5 µm.

Example 2: Production of Optical Film b

An optical film b was produced in the same manner as in the production of the optical film a of Example 1 except that instead of the coating liquid A, the coating liquid C was used. The film thickness of the hardcoat layer was 5 µm.

Example 3: Production of Optical Film c

A scratch resistant layer forming composition (coating liquid E) was applied to the film subjected to the calender treatment and produced in Example 1 using a gravure coater so that the thickness of the dried film was 0.1 µm, and dried at 100° C. Thereafter, while nitrogen purging was performed so that the atmosphere had an oxygen concentration of 100 ppm or less, the coating film was irradiated with ultraviolet rays at an irradiation dose of 300 mJ/cm$^2$ from the coating film side using an air-cooled metal halide lamp (manufactured by Eye Graphics Co., Ltd.) of 160 mW/cm$^2$ and cured to produce an optical film c. The composition of the coating liquid E is shown in Table 2 below.

TABLE 2

| Component\Scratch resistant layer forming composition | Coating liquid E |
|---|---|
| KAYARAD DPHA | 8.90 |
| RS-90 (manufactured by DIC Corporation) | 8.28 |
| Methyl ethyl ketone | 82.55 |
| IRGACURE 127 | 0.28 |

The unit of the content of each component is parts by mass.
KAYARAD DPHA: manufactured by Nippon Kayaku Co., Ltd.
IRGACURE 127: polymerization initiator (manufactured by BASF SE)

Example 4: Production of Optical Film d

An optical film d was produced in the same manner as in the production of the optical film a of Example 1 except that instead of the coating liquid A, the coating liquid B was used. The film thickness of the hardcoat layer was 5 µm.

Example 5: Production of Optical Film e

The coating liquid A was applied to the base material S-1 using a gravure coater to obtain a coating film. After drying the coating film at 100° C., while nitrogen purging was performed so that the atmosphere had an oxygen concentration of 100 ppm or less, the coating film was irradiated with ultraviolet rays at an irradiation dose of 5 mJ/cm$^2$ from the coating film side using an air-cooled metal halide lamp (manufactured by Eye Graphics Co., Ltd.) of 10 mW/cm$^2$ and cured. In this case, the curing rate of the coating film was 8% and the curing rate of the surface layer of the coating film was 60%.

Thereafter, the coating film was cured while bringing the coating film into contact with one smooth metal roll (25° C.). The curing was performed by, while nitrogen purging was performed so that the atmosphere had an oxygen concentration of 100 ppm or less, irradiating the coating film with ultraviolet rays at an irradiation dose of 1,000 mJ/cm$^2$ from the base material side using an air-cooled metal halide lamp (manufactured by Eye Graphics Co., Ltd.) of 160 mW/cm$^2$.

The conditions in a case where the coating film was brought into contact with one smooth metal roll are shown below.

Kind of smooth metal roll: hard chrome plated chrome molybdenum steel
Surface roughness (Ra) of smooth metal roll: 8 nm In this manner, an optical film e was produced. The film thickness of the hardcoat layer was 5 µm.

Example 6: Production of Optical Film f

An optical film f was produced in the same manner as in the production of the optical film e of Example 5 except that instead of the base material S-1, a polyethylene terephthalate (PET) base material was used. For the PET base material, a polyethylene terephthalate base material having a thickness of 40 µm was produced by the method described in paragraphs <0148> to <0160> of JP2014-209162A. The film thickness of the hardcoat layer was 5 µm.

(Production of Base Material S-3)
[Production of Polyimide Powder]

832 g of N,N-dimethylacetamide (DMAc) was put into a 1 L reactor equipped with a stirrer, a nitrogen injection device, a dropping funnel, a temperature controller and a condenser under a nitrogen stream, and then the temperature of the reactor was set to 25° C. Here, 64.046 g (0.2 mol) of bistrifluoromethylbenzidine (TFDB) was added and dissolved to obtain a solution. While keeping the obtained solution at 25° C., 31.09 g (0.07 mol) of 2,2-bis(3,4-dicarboxyphenyl)hexafluoropropane dianhydride (6FDA) and 8.83 g (0.03 mol) of biphenyltetracarboxylic acid dianhydride (BPDA) were put into the solution and the materials were allowed to react under stirring for a predetermined period of time. Then, 20.302 g (0.1 mol) of terephthaloyl chloride (TPC) was added thereto to obtain a polyamic acid solution having a solid content concentration of 13% by mass. Next, 25.6 g of pyridine and 33.1 g of acetic anhydride were put into the polyamic acid solution and stirred for 30 minutes. The materials were further stirred at 70° C. for 1 hour and then cooled to room temperature. 20 L of methanol was added and the precipitated solid content was filtered and pulverized. Thereafter, the resultant was dried at 100° C. in vacuum for 6 hours to obtain 111 g of a solid polyimide powder.

[Production of Base Material S-3]

100 g of the solid polyimide powder was dissolved in 670 g of N,N-dimethylacetamide (DMAc) to obtain a 13% by mass solution. The obtained solution was cast on a stainless steel plate and dried with hot air at 130° C. for 30 minutes. Then, the film was peeled off from the stainless steel plate and fixed to a frame with pins. The frame to which the film was fixed was put into a vacuum oven and was heated for 2 hours while gradually increasing the heating temperature from 100° C. to 300° C., and then gradually cooled. The cooled film was separated from the frame and then was further subjected to a heat treatment at 300° C. for 30 minutes as a final heat treatment step. Thus, a base material S-3 (unstretched) formed of polyimide and having a thickness of 30 μm was obtained.

(Production of Base Material S-4)

100 g of the solid polyimide powder was dissolved in 670 g of N,N-dimethylacetamide (DMAc) to obtain a 13% by mass solution. The obtained solution was cast on a stainless steel plate and dried with hot air at 130° C. for 30 minutes. Then, the film was peeled off from the stainless steel plate and while heating the film at 200° C., the film was stretched 1.2 times in the longitudinal direction and 1.2 times in the width direction. Thereafter, the film was fixed to a frame with pins, put into a vacuum oven, heated for 2 hours while gradually increasing the heating temperature from 100° C. to 300° C., and then gradually cooled. The cooled film was separated from the frame and then was further subjected to a heat treatment at 300° C. for 30 minutes as a final heat treatment step. Thus, a base material S-4 formed of polyimide and having a thickness of 30 μm was obtained.

(Production of Base Material S-5)

A base material S-5 formed of polyimide and having a thickness of 50 μm was obtained in the same method as the formation method of the base material S-4 except that the amount of the polyimide solution cast on the stainless steel plate was adjusted.

(Production of Base Material S-6)

94 g of the solid polyimide powder and 6 g of LA-F70 (manufactured by ADEKA CORPORATION) were dissolved in 670 g of N,N-dimethylacetamide (DMAc) to obtain 13% by mass solution. The obtained solution was cast on a stainless steel plate and dried with hot air at 130° C. for 30 minutes. Then, the film was peeled off from the stainless steel plate, fixed to a frame with pins, the frame to which the film was fixed was put into a vacuum oven, while gradually increasing the heating temperature from 100° C. to 300° C., the film was heated for 2 hours, and then gradually cooled. The cooled film was separated from the frame and then was further subjected to a heat treatment at 300° C. for 30 minutes as a final heat treatment step. Thus, a base material S-6 (unstretched) formed of polyimide and having a thickness of 30 μm was obtained.

Example 7: Production of Optical Film g

An optical film g was produced in the same manner as in the production of the optical film a of Example 1 except that instead of the base material S-1, the base material S-3 was used. The film thickness of the hardcoat layer was 5 μm.

Example 8: Production of Optical Film h

An optical film h was produced in the same manner as in the production of the optical film a of Example 1 except that instead of the base material S-1, the base material S-4 was used. The film thickness of the hardcoat layer was 5 μm.

Example 9: Production of Optical Film i

An optical film i was produced in the same manner as in the production of the optical film b of Example 2 except that instead of the base material S-1, the base material S-4 was used. The film thickness of the hardcoat layer was 5 μm.

Example 10: Production of Optical Film j

An optical film j was produced in the same manner as in the production of the optical film c of Example 3 except that instead of the base material S-1, the base material S-4 was used.

Example 11: Production of Optical Film k

An optical film k was produced in the same manner as in the production of the optical film d of Example 4 except that instead of the base material S-1, the base material S-4 was used. The film thickness of the hardcoat layer was 5 μm.

Example 12: Production of Optical Film l

An optical film l was produced in the same manner as in the production of the optical film e of Example 5 except that instead of the base material S-1, the base material S-4 was used. The film thickness of the hardcoat layer was 5 μm.

Example 13: Production of Optical Film m

An optical film m was produced in the same manner as in the production of the optical film a of Example 1 except that instead of the base material S-1, the base material S-5 was used. The film thickness of the hardcoat layer was 5 μm.

Example 14: Production of Optical Film n

An optical film n was produced in the same manner as in the production of the optical film e of Example 5 except that instead of the base material S-1, the base material S-5 was used. The film thickness of the hardcoat layer was 5 μm.

Example 15: Production of Optical Film o

An optical film o was produced in the same manner as in the production of the optical film a of Example 1 except that instead of the base material S-1, the base material S-6 was used. The film thickness of the hardcoat layer was 5 μm.

Comparative Example 1: Production of Optical Film r1

The coating liquid A was applied to the base material S-1 using a gravure coater to obtain a coating film. After drying the coating film at 100° C., while nitrogen purging was performed so that the atmosphere had an oxygen concentration of 100 ppm or less, the film was irradiated with ultraviolet rays at an irradiation dose of 300 mJ/cm$^2$ from the coating film side using an air-cooled metal halide lamp (manufactured by Eye Graphics Co., Ltd.) of 160 mW/cm$^2$ and cured. In this manner, an optical film r1 was produced. The film thickness of the hardcoat layer was 5 μm.

Comparative Example 2: Production of Optical Film r2

An optical film r2 was produced in the same manner as in the production of the optical film a of Example 1 except that instead of the coating liquid A, the coating liquid D was used. The film thickness of the hardcoat layer was 5 μm.

Comparative Example 3: Production of Optical Film r3

An optical film r3 was produced in the same manner as in the production of the optical film r1 of Comparative Example 1 except that instead of the base material S-1, the smoothed aramid base material S-2 was used. The film thickness of the hardcoat layer was 5 μm.

The smoothed aramid base material S-2 was produced as follows.

A portion of the polymer solution obtained in the production of the base material S-1 was cast on a glass plate with Ra of 1 nm produced by a float method and heated to 120° C. using a hot plate using a T-die so that the final film thickness was 40 μm. Next, the film was dried so that the polymer concentration was 60% by mass and peeled off from the glass plate. Next, the film including the solvent was stretched 1.1 times in a machine direction (MD) in the atmosphere at 40° C. and was washed with water at 50° C. so as to remove the solvent. Further, the film was stretched 1.2 times in a transverse direction (TD) in a drying furnace at 340° C. to obtain a base material S-2 formed of aromatic polyamide and having a thickness of 40 μm.

Comparative Example 4: Production of Optical Film r4

An optical film r4 was produced in the same manner as in the production of the optical film a of Example 1 except that instead of the base material S-1, a polymethyl methacrylate (PMMA) base material was used. The film thickness of the hardcoat layer was 5 μm.

As the PMMA base material, an optical film No. 1 having a thickness of 40 μm described in JP2016-071264A was used.

[Evaluation of Optical Film]

(Repetitive Folding Resistance)

A sample film having a width of 15 mm and a length of 80 mm that was allowed to stand for 1 hour or longer in a state at 25° C. and a relative humidity of 65% was prepared and measured according to JIS P 8115:2001 under the condition of a load of 500 g using a folding endurance test (MIT, BE-201 type, manufactured by TESTER SANGYO CO, LTD., folding radius: 0.4 mm). The repetitive folding resistance was evaluated based on the number of times until the film was broken.

A: 10000 or more

B: 1000 or more and less than 10000

C: less than 1000

(Reflection Characteristics)

The reflection characteristics were measured using a three-dimensional gonio-spectrophotometric color measurement system GCMS-3B (Murakami Color Research Laboratory, Co., Ltd.). Specifically, an incident ray was made incident on the optical film from −60° with respect to the normal direction (assumed to be 0°), and reflected light was measured in a range from 0° to 80°. The angle width within which 10% of outgoing ray peak intensity was obtained was set to θ, and a value obtained by multiplying a value obtained by dividing the intensity of the outgoing ray at 50° by the outgoing ray peak intensity by 100 was set to I (%).

(Pencil Hardness)

The pencil hardness was measured according to JIS K 5600-5-4:1999.

(Smoothness)

With respect to the surface of the optical film, the surface roughness Ra was measured using Vertscan 2.0 (manufactured by Ryoka Systems Inc.) in a view field size of 3724 μm×4965 μm at a lens magnification of ×2.5 and a lens barrel magnification of ×0.5 in a Wave mode.

(Scratch Resistance)

A rubbing test was performed on the surface of the optical film using a rubbing test under the following conditions and the result was used as an index of scratch resistance.

Evaluation environment condition: 25° C., relative humidity: 60%

Rubbing material: steel wool (manufactured by NIHON STEEL WOOL Co., Ltd., Grade No. 0000) was wound at a rubbing end portion (1 cm×1 cm) of the tester brought into contact with the sample and fixed with a band.

Moving Distance (One Way): 13 cm

Rubbing speed: 13 cm/sec

Load: 1000 g/cm$^2$

Contact Area at End Portion: 1 cm×1 cm

Number of Rubbings: 100 reciprocating cycles

Oily black ink was coated on the rear surface of the sample which was completely rubbed, and scratches in the rubbed portion were visually observed under reflected light and evaluated:

A: No scratches observable at all even in very careful observation.

B: Weak scratches observable in very careful observation, but no problem.

C: Scratches readily observable at one glance, and thus very conspicuous.

TABLE 3

|  | Comparative Example 1 | Comparative Example 2 | Comparative Example 3 | Comparative Example 4 | Example 1 | Example 2 | Example 3 | Example 4 | Example 5 | Example 6 |
|---|---|---|---|---|---|---|---|---|---|---|
| Optical film | r1 | r2 | r3 | r4 | a | b | c | d | e | f |
| Base material | S-1 | S-1 | S-2 | PMMA | S-1 | S-1 | S-1 | S-1 | S-1 | PET |
| Hardcoat layer forming composition | Coating liquid A | Coating liquid D | Coating liquid A | Coating liquid A | Coating liquid A | Coating liquid C | Coating liquid A | Coating liquid B | Coating liquid A | Coating liquid A |
| Filling rate of inorganic particles in hardcoat layer | — | 46% by volume | — | — | — | 40% by volume | — | — | — | — |
| Number of peaks in particle diameter distribution of inorganic particles | — | 2 | — | — | — | 1 | — | — | — | — |
| Scratch resistant layer | — | — | — | — | — | — | — | Provided | — | — |
| Calender treatment | — | Provided | — | Provided | Provided | Provided | Provided | Provided | — | — |
| Curing rate of coating film before calender treatment | — | 65% | — | 54% | 54% | 68% | 54% | 42% | — | — |
| Step (iii-1) of curing coating film while bringing coating film into contact with one smooth metal roll | — | — | — | — | — | — | — | — | Provided | Provided |
| Curing rate of coating film immediately before step (iii-1) | — | — | — | — | — | — | — | — | 8% | 8% |
| Curing rate of surface layer of coating film immediately before step (iii-1) | — | — | — | — | — | — | — | — | 60% | 60% |
| Repetitive folding resistance | A | B | A | C | A | B | A | A | A | A |
| θ(°) | 8 | 6 | 7 | 6 | 4 | 6 | 3 | 3 | 3 | 5 |
| I (%) | 1.3 | 7.2 | 1.3 | 0.9 | 0.7 | 1 | 0.5 | 0.4 | 0.7 | 0.8 |
| Pencil hardness | 4H | 5H | 3H | 3H | 3H | 5H | 4H | 3H | 4H | 2H |
| Smoothness (nm) | 32 | 8 | 18 | 3.2 | 1.7 | 4.2 | 1.8 | 1.6 | 2 | 3.8 |
| Scratch resistance | B | B | B | B | B | B | A | B | B | B |

TABLE 4

|  | Example 7 | Example 8 | Example 9 | Example 10 | Example 11 | Example 12 | Example 13 | Example 14 | Example 15 |
|---|---|---|---|---|---|---|---|---|---|
| Optical film | g | h | i | j | k | l | m | n | o |
| Base material | S-3 | S-4 | S-4 | S-4 | S-4 | S-4 | S-5 | S-5 | S-6 |
| Hardcoat layer forming composition | Coating liquid A | Coating liquid A | Coating liquid C | Coating liquid A | Coating liquid B | Coating liquid A | Coating liquid A | Coating liquid A | Coating liquid A |
| Filling rate of inorganic particles in hardcoat layer | — | — | 40% by volume | — | — | — | — | — | — |
| Number of peaks in particle diameter distribution of inorganic particles | — | — | 1 | — | — | — | — | — | — |
| Scratch resistant layer | — | — | — | Provided | — | — | — | — | — |
| Calender treatment | Provided | Provided | Provided | Provided | Provided | — | Provided | — | Provided |
| Curing rate of coating film before calender treatment | 54% | 54% | 68% | 54% | 42% | — | 54% | — | 54% |
| Step (iii-1) of curing coating film while bringing coating film into contact with one smooth metal roll | — | — | — | — | — | Provided | — | Provided | — |
| Curing rate of coating film immediately before step (iii-1) | — | — | — | — | — | 8% | — | 8% | — |
| Curing rate of surface layer of coating film immediately before step (iii-1) | — | — | — | — | — | 60% | — | 60% | — |
| Repetitive folding resistance | A | A | B | A | A | A | B | B | A |
| θ(°) | 3 | 4 | 6 | 3 | 3 | 3 | 3 | 2 | 4 |
| I (%) | 0.4 | 0.6 | 0.8 | 0.4 | 0.4 | 0.6 | 0.4 | 0.3 | 0.6 |
| Pencil hardness | 2H | 3H | 5H | 4H | 3H | 4H | 5H | 5H | 2H |
| Smoothness (nm) | 1.5 | 2.1 | 4.8 | 2.2 | 1.9 | 2 | 1.6 | 1.4 | 2.3 |
| Scratch resistance | B | B | B | A | B | B | B | B | B |

From the results shown in Tables 3 and 4, it was found that the optical films of Examples of the present invention have high pencil hardness, excellent repetitive folding resistance, and excellent reflection characteristics (having glass-like reflection characteristics).

What is claimed is:

1. An optical film comprising:
   a base material; and
   a hardcoat layer,
   wherein a pencil hardness measured according to JIS K 5600-5-4:1999 is 2H or higher,
   the number of times of folding endurance measured by an MIT tester according to JIS P 8115:2001 is 1000 or more, and
   wherein the reflection characteristics measured using a three-dimensional gonio-spectrophotometric color measurement system is that;
      in a case where an incident ray is made incident on the optical film from −60° with respect to a normal direction of the optical film, an angle width within which 10% of outgoing ray peak intensity is obtained is 6° or less, and an intensity of an outgoing ray at 50° from the normal direction is 1% or less of the outgoing ray peak intensity.

2. The optical film according to claim 1,
   wherein a surface roughness of an outermost surface on a side on which the hardcoat layer is laminated is 5 nm or less.

3. The optical film according to claim 1,
   wherein a surface roughness of an outermost surface on a side on which the hardcoat layer is laminated is 2 nm or less.

4. The optical film according to claim 1,
   wherein the hardcoat layer includes inorganic particles, and particle diameters of the inorganic particles have a single distribution.

5. The optical film according to claim 4,
   wherein a filling rate of the inorganic particles in the hardcoat layer is 55% by volume or less.

6. The optical film according to claim 1, further comprising:
   a scratch resistant layer on a surface of the hardcoat layer opposite to the base material.

7. The optical film according to claim 1,
   wherein the number of times of folding endurance measured by an MIT tester according to JIS P 8115:2001 is 10000 or more.

8. The optical film according to claim 1,
   wherein the pencil hardness measured according to JIS K 5600-5-4:1999 is 4H or higher.

9. A method for manufacturing an optical film including a base material, and a hardcoat layer, in which a pencil hardness measured according to JIS K 5600-5-4:1999 is 2H or higher, the number of times of folding endurance measured by an MIT tester according to JIS P 8115:2001 is 1000 or more, and
   wherein the reflection characteristics measured using a three-dimensional gonio-spectrophotometric color measurement system is that;
      in a case where an incident ray is made incident on the optical film from −60° with respect to a normal direction of the optical film, an angle width within which 10% of outgoing ray peak intensity is obtained is 6° or less, and an intensity of an outgoing ray at 50° from the normal direction is 1% or less of the outgoing ray peak intensity, the method comprising:
   (i-1) applying a hardcoat layer forming composition to the base material to provide a coating film; and
   (iii-1) curing the coating film while bringing the coating film into contact with one smooth metal roll.

10. The method for manufacturing an optical film according to claim 9,
    wherein a curing rate of the coating film immediately before the step (iii-1) is 20% or less.

11. The method for manufacturing an optical film according to claim 9, further comprising:
    between the steps (i-1) and (iii-1),
    (ii-1) curing a surface layer of the coating film to set a curing rate of the surface layer of the coating film to 50% or more.

12. The method for manufacturing an optical film according to claim 9,
    wherein a surface roughness of the metal roll in the step (iii-1) is 40 nm or less.

13. A method for manufacturing an optical film including a base material, and a hardcoat layer, in which a pencil hardness measured according to JIS K 5600-5-4:1999 is 2H or higher, the number of times of folding endurance measured by an MIT tester according to JIS P 8115:2001 is 1000 or more, and
    wherein the reflection characteristics measured using a three-dimensional gonio-spectrophotometric color measurement system is that;
       in a case where an incident ray is made incident on the optical film from −60° with respect to a normal direction of the optical film, an angle width within which 10% of outgoing ray peak intensity is obtained is 6° or less, and an intensity of an outgoing ray at 50° from the normal direction is 1% or less of the outgoing ray peak intensity, the method comprising:
    (i-2) applying a hardcoat layer forming composition to the base material to provide a coating film;
    (ii-2) curing the coating film; and
    (iii-2) performing a calender treatment.

14. The method for manufacturing an optical film according to claim 13,
    wherein the step (ii-2) is setting a curing rate of the coating film to 10% to 80%.

15. The method for manufacturing an optical film according to claim 13,
    wherein the calender treatment in the step (iii-2) is performed using two rolls, a line speed is 20 m/min or more, a temperature of at least one roll is 80° C. or higher, a nip pressure is 100 kg/cm or higher, and the number of nips is 1 or more.

16. The method for manufacturing an optical film according to claim 13,
    wherein the calender treatment in the step (iii-2) is performed using two rolls, one of the two rolls close to the coating film is a metal roll, and a surface roughness of the metal roll is 40 nm or less.

* * * * *